United States Patent
Guo et al.

(10) Patent No.: US 12,140,672 B2
(45) Date of Patent: Nov. 12, 2024

(54) LIDAR SENSOR ON CHIP WITH DOPPLER-SENSING PIXELS AND PRIORITY-BASED DATA TRANSFER

(71) Applicants: Zhongyong Guo, Marlboro, NJ (US); Xin Jin, Waterloo (CA)

(72) Inventors: Zhongyong Guo, Marlboro, NJ (US); Xin Jin, Waterloo (CA)

( * ) Notice: Subject to any disclaimer, the term of this patent is extended or adjusted under 35 U.S.C. 154(b) by 999 days.

(21) Appl. No.: 17/126,623

(22) Filed: Dec. 18, 2020

(65) Prior Publication Data

US 2022/0011430 A1 Jan. 13, 2022

Related U.S. Application Data

(63) Continuation-in-part of application No. 16/926,400, filed on Jul. 10, 2020, now abandoned.

(51) Int. Cl.
| | | |
|---|---|---|
| G01S 17/58 | (2006.01) | |
| G01S 7/481 | (2006.01) | |
| G01S 7/4913 | (2020.01) | |
| G01S 17/931 | (2020.01) | |

(52) U.S. Cl.
CPC ............ *G01S 17/58* (2013.01); *G01S 7/4816* (2013.01); *G01S 7/4913* (2013.01); *G01S 17/931* (2020.01)

(58) Field of Classification Search
None
See application file for complete search history.

(56) References Cited

U.S. PATENT DOCUMENTS

| | | | | |
|---|---|---|---|---|
| 5,227,863 A | * | 7/1993 | Bilbrey | ................. H04N 5/262 348/588 |
| 9,179,062 B1 | * | 11/2015 | Rivard | ................... H04N 23/80 |

* cited by examiner

*Primary Examiner* — Luke D Ratcliffe

(57) ABSTRACT

Doppler LIDARs, such as those used in ADAS (advanced driver assistance system) and autonomous vehicles, may need to sense objects at many directions. Some of the Doppler LIDAR devices use mechanically moving parts to scan over a range of directions and the various directions are not sensed simultaneously but sensed in turns over time. Mechanical moving parts generally have higher costs, lower reliability and shorter Mean Time To Failure (MTTF). The LIDAR sensor on chip with Doppler-sensing pixels disclosed herein uses a Doppler sensing-chip that enables Doppler LIDAR devices to sense many directions simultaneously in parallel without having to use mechanical scan and mechanical moving parts, even without having to use electronic scan. Lower costs, higher reliability, and faster detection time as well as higher direction sensing accuracy are objectives of this invention.

8 Claims, 9 Drawing Sheets

LIDAR SENSOR ON CHIP WITH DOPPLER-SENSING PIXELS AND PRIORITY-BASED DATA TRANSFER

CROSS-REFERENCE TO RELATED APPLICATION

This application is a continuation-in-part of application Ser. No. 16/926,400, filed on Jul. 10, 2020.

BACKGROUND OF THE INVENTION

Field of the Invention

This invention relates generally to utility of Doppler effects, in particular, to LIDAR sensors having Doppler-sensing pixels.

Description of the Related Art

LIDAR (light detection and ranging) devices are viewed as a major sensing means in an ADAS (advanced driver assistance system) of a vehicle, as well as in a driving control system of an autonomous vehicle. In order to "see" objects in various directions around the LIDAR receiver device, and to determine directions of the objects, mechanical means may be used to scan across directions by the LIDAR system, e.g. the continuously rotating platform used in prior art patent U.S. Pat. No. 8,836,922. It is known that mechanical scanning parts, especially those continuously moving mechanical parts, are subject to failures with shorter mean time to failure (MTTF) and higher costs.

CW (continuous wave) and FMCW (frequency modulated continuous wave) Doppler LIDAR, as disclosed in prior patent U.S. Pat. No. 6,697,148 is a powerful sensing tool for applications such as ADAS and autonomous vehicles, however it performs speed and/or distance measurements at a single direction at a time. To sense objects in various directions, it may still have to use scanning means such as rotating mirror or other mechanically moving aiming means.

Furthermore, in time critical applications, not all directions of a LIDAR sensing data are of equal level of urgency. Sequentially scanning over the field of view and sequentially transferring the data is generally non-optimal and negatively affects detection and response time.

There is a need in the art to perform CW and/or FMCW Doppler detection and ranging in many or all directions of interest, without using mechanically moving parts, even without using any forms of scanning. There is also a need to differentiate sensing data obtained from various directions and convey the most urgent data with higher priority.

BRIEF SUMMARY OF THE INVENTION

In one aspect, the invention provides an embodiment of a Doppler LIDAR sensor chip, comprising: an array of pixels; and an interface module, coupled with the pixels, for conveying sensing results outside the sensor chip; wherein each of the pixels comprising: a grating coupler for selectively coupling into the chip a modulated light signal, a photo-detector optically coupled with the grating coupler, for detecting a modulated light signal from objects being sensed, and producing a detected signal; and at least one mixer, coupled with the photo-detector and the interface module, for mixing at least one local replica signals with the detected signal or a signal derived from the detected signal, and producing at least one mixing product signals.

In another aspect, at least one embodiment of the invention provides a method for effectively conveying data from pixels of a sensor device to a processor, comprising steps of: sending initial data produced by a sample set of pixels to a processor; determining, by the processor, a table of parameters specifying a number of categories for conveying data in a next period from each of the pixels; queuing, for each of the categories, the data produced by pixels into queuing buffers according to the parameters for the corresponding category that a pixel is assigned to; multiplexing, according to priority and scheduling parameters in the table, the queued data from the buffers into a transmission channel; if the transmission channel cannot convey all queued data in the buffers according to the scheduling parameters specified in the table, discarding some most stale data from the lowest priority buffers; and repeating the determining, queuing, multiplexing and discarding steps above in another next period. This way, more urgent data are identified and conveyed with priority.

In yet another aspect, at least one embodiment of the invention provides a method for effectively conveying data from pixels of a sensor device to a processor, comprising steps of: determining, by a pre-processor locally coupled with the pixels, which of a plurality of categories each of the pixels is assigned to; queuing data produced by the pixels into queuing buffers, according to the category being assigned to, and according to a set of parameters associated with the category; multiplexing, according to priority and scheduling parameters specified for the categories, the queued data from the buffers into a transmission channel; discarding, if the transmission channel cannot convey all queued data in the buffers according to the scheduling parameters specified for the categories, some most stale data from the lowest priority buffers; and repeating the determining, queuing, multiplexing and discarding steps above in next period. In this way, more urgent data are identified locally and conveyed with priority.

Other aspects of the invention will become clear thereafter in the detailed description of the preferred embodiments and the claims.

BRIEF DESCRIPTION OF THE DRAWINGS

For a better understanding of the invention and to show more clearly how it may be carried into effect, reference will now be made, by way of example only, to the accompanying drawings which illustrate distinctive features of at least one exemplary embodiment of the invention, in which.

DETAILED DESCRIPTION OF THE INVENTION

It will be appreciated that in the description herein, numerous specific details are set forth in order to provide a thorough understanding of the invention. However, it will be understood by those of ordinary skill in the art that the invention may be practiced without these specific details. In other instances, well-known methods, procedures and components have not been described in detail so as not to obscure the invention. Furthermore, this description is not to be considered as limiting the scope of the invention, but rather as merely providing a particular preferred working embodiment thereof.

Figure 1:
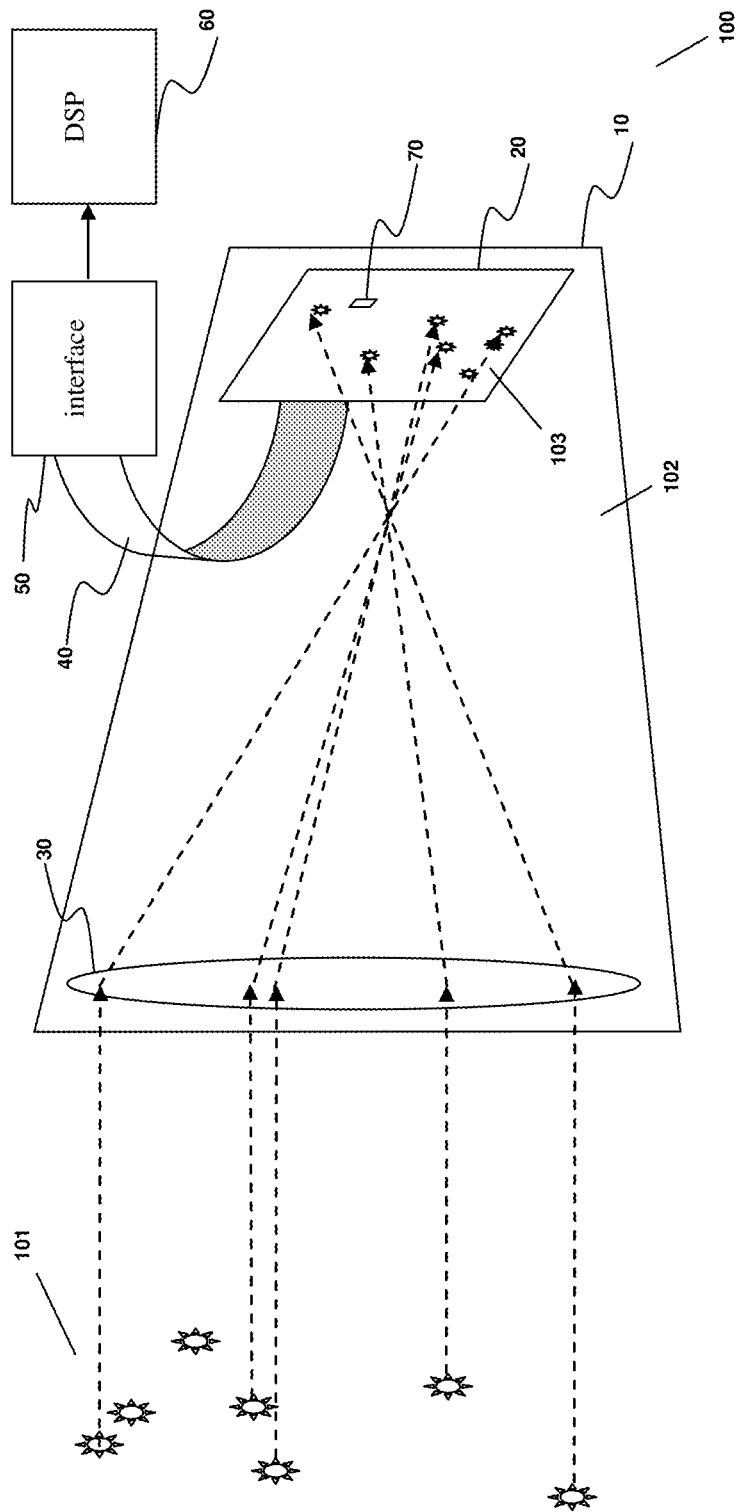
FIG. 1, by way of example, illustrates a functional block diagram of a Doppler LIDAR receiver device using a LIDAR sensor with Doppler sensing pixels.

By way of example, FIG. 1 illustrates a functional diagram of a Doppler LIDAR receiver device using a LIDAR sensor with direct Doppler sensing pixels. In the figure, objects 101 illuminated by modulated light source (such as disclosed in patent U.S. Pat. No. 6,697,148), or lights emitted by modulated light beacons 101 (such as disclosed in patent application U.S. Ser. No. 16/917,805), which are attached to objects being sensed, are sensed by at least one LIDAR receiver device 100 in an application field, comprising of a Doppler sensing unit 102, a digital signal processor (DSP) module 60, an interface module 50 and interconnect wires 40. The Doppler sensing unit 102 includes a housing 10 that may be designed in different shapes to hold the components of the Doppler sensing unit, and suitable for being mounted on a platform using the sensing unit, such as a car; a LIDAR sensor chip 20 that contains an array of Doppler sensing pixels of light signal, e.g., the pixel 70 as one of them, which will be explained in more detail with FIG. 2 hereinafter; an optical scope 30 that may be as simple as a lens as shown in the drawing, or a pinhole (including a pinhole-equivalent structure), or may be more complex to include a plurality of lenses, optical filter(s), aperture control means, focal adjustment means, zoom adjustment means, may further include mirrors and optical fiber or light guide, etc. (not shown in drawing); the modulated light signals from objects 101, either reflected by surface of the objects, or directly emitted from a light beacon devices, will project their images 103 onto the pixels on the LIDAR sensor chip 20, being Doppler-sensed by individual pixels e.g., the pixel 70 as one of them, as will be explained with FIG. 2; and on the chip, a portion of the semiconductor area implements an interface circuit (not shown in drawing) to collect the Doppler sensing output signals from the pixels on chip, and through the wires 40 to pass the signals to the mating interface module 50 for further processing at DSP 60. As can be seen in the figure, direction information of individual objects, as long as within the scope of view, is indicated by positions of pixels in the array on chip, electronically represented by its address (position index of pixels), without the need of scanning using any moving mechanical means. The pixel address carries important information about direction of objects relative to the Doppler sensing unit 102. In certain applications, it may be desirable to place the pixels on chip unevenly so as to optimize resolution of direction detection, and/or compensate deformation caused by optics. The physical shape of individual pixels may not have to be square or rectangular and may use other shapes to optimize or make tradeoff of performances and/or costs. The drawing of FIG. 1 is not drawn to scale.

Figure 2:
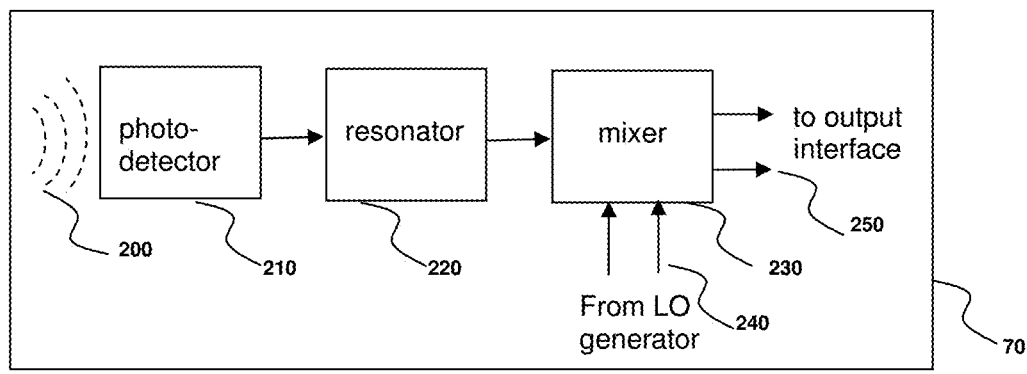
FIG. 2 is a block diagram showing functions built into individual Doppler sensing pixels on the sensor chip shown in FIG. 1.

FIG. 2 is a block diagram showing functions built into each of the Doppler sensing pixels 70 on the sensor chip 20 shown in FIG. 1. The modulated light signal 200 from one of the objects 101 (of FIG. 1) may be exposed to a pixel 70 in question through the optical scope 30 (of FIG. 1). In a preferred embodiment, the pixel is on a focal plane of the optical scope 30 (of FIG. 1) for the objects under detection. The strength of the light signal 200 will get detected into electrical signal in an area of semiconductor on the pixel that functions as photo-detector 210. Preferably the photo sensing area of the photo-detector 210 is as large as possible in the allowed pixel area to increase sensitivity of sensing. In one embodiment, on top of a pixel, a micro optical lens may also be built to direct light coming to the pixel onto the effective photo-detector area. The output signal from the photo-detector in an analog signal that reflects the instantaneous light strength exposed to the sensing area, including the amplitude waveform modulated onto the light source, which is the wanted signal, also may include strength variations superimposed onto the sensing area from other light sources, which is unwanted interferences. To increase signal to interference ratio in output of the photo-detector, optionally and preferably a resonator 220 is implemented within the semiconductor area of the pixel 70, which may be a LC tuning circuit (inductor-capacitor tuning circuit) that resonates at the frequency band of the modulating signal (as used to modulate the light source, refer to prior art patent U.S. Pat. No. 6,697,148 and/or patent application U.S. Ser. No. 16/917,805), or may be a more sophisticated filter, to attenuate the frequency spectrum outside the modulating signal band of the modulated light signal. The photo-detector output signal, or filtered output signal of the photo-detector is then fed into a mixer 230, preferably an I-Q mixer, to be mixed with a local replica(s) 240 of the modulating signal or signals, which is a signal (or are signals) identical in frequency (or frequencies) to the one(s) used to modulate the light source. When an I-Q mixer is used, the local replica signal includes a phase shifted version of 90 degrees for each of the tone frequencies in use, as known to the skilled in the art. Also as an art known to the skilled, the mixer can be built in various ways, one simple embodiment is a diode ring, each of the I/Q arms is built by four diodes. More sophisticated multipliers such as four quadrant multiplier may also be used as long as suitable for the frequency in use and takes acceptable area of the pixel of semiconductor. It is well-known to the skilled in the art how to optimize the mixer circuit and local replica signal waveform and level, e.g., using a rectangular wave counterpart of local replica, combining the local replica components vs. separately mixing each of the components of local replica signal. The output of the mixer is a mixing product signal 250, containing Doppler shifts in a CW modulated use case, also containing frequency shifts if FMCW signal is used in modulating the light source, which can be used to derive range (distance) of the object sensed by the pixel in question. As an art known to the skilled, the way of deriving speed and range (distance) is not explained herein. The local replica signal(s) is shown in the figure as coming from a LO (local oscillator) generator, in embodiments where the modulated light source is co-located in the same device (e.g., as in patent U.S. Pat. No. 6,697,148) the LO generator may be simply the one used in the light transmitter; whereas in embodiments where the modulated light source is away from the LIDAR receiver device, e.g., the beacon embodiment or the illuminator embodiment as disclosed in patent application U.S. Ser. No. 16/917,805, the LO generator may need to be built according to what teaches in application U.S. Ser. No. 16/917,805. In either case, the generator produces the local replica signal(s) to feed all pixels on the sensor chip 20. Preferably the mixing product signals from the mixer 230 are amplified before sending out of the pixels, and the amplifier (not shown in drawing) may be implemented as a part of the mixer 230. Since not the entire area of the pixel silicon are used for implementing the photodetector, for improved sensitivity and signal to noise ratio, in a preferred embodiment, an optical micro lens (not shown in drawing) may be placed on top of each pixel to direct more lights exposed onto the pixel to the silicon or semiconductor area of the photo-detector.

Figure 3:
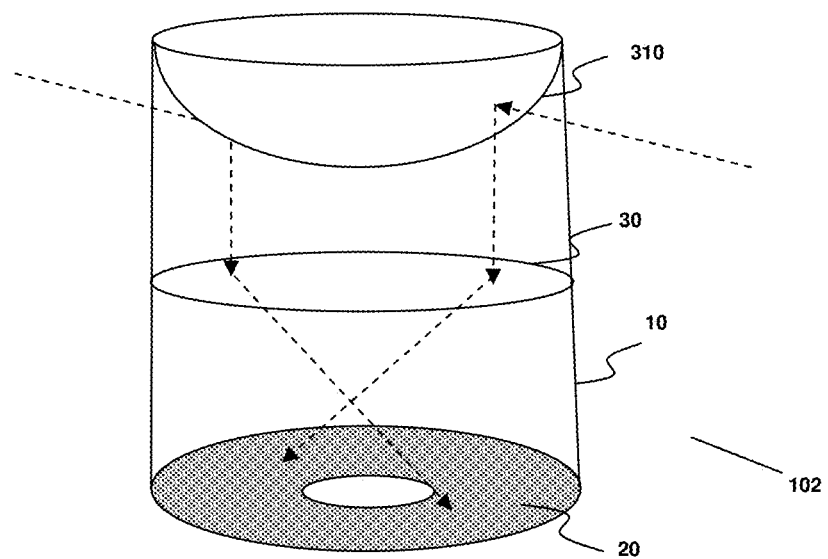
FIG. 3 illustrates an exemplary embodiment of an omni-directional Doppler LIDAR for detecting objects in a space of hemisphere.
Figure 4:
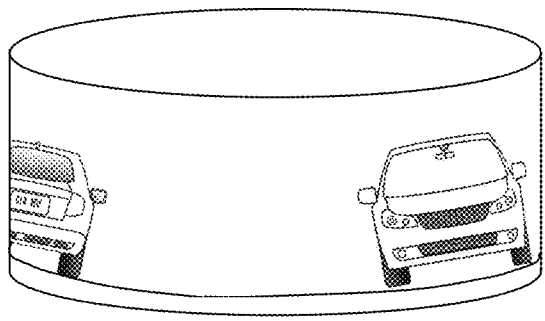
FIG. 4 is a concept illustration of an electronically reconstructed Doppler sensing panorama superimposed onto an a visible light panorama.

The area containing Doppler sensing pixel array in sensor chip 20 does not have to use rectangular shape, in some application scenarios, shapes other than rectangular may be preferred. FIG. 3 illustrates an exemplary embodiment of an omnidirectional Doppler sensing unit 102, in which the sensing unit structure is supported by a housing 10 which is transparent for the upper portion to allow light signals to come in from all 360 degrees around the horizontal plane and nearly entire lower hemisphere; a lens or a set of lenses 30 makes the images focus on the sensing pixels on Doppler sensor chip 20; a specially designed convex mirror 310, which may be built according to what patent U.S. Pat. No. 6,744,569 teaches, reflects light signals of objects from all directions around horizontal plane and lower hemisphere onto the sensor pixels on chip 20. As will be appreciated, the effective sensing area of the pixel array may be preferred to shape as a ring plate, and through DSP means, the images sensed by the pixel array on the ring plate shaped area may be electronically reconstructed into a Doppler sensing Panorama, superimposed onto an a visible light Panorama as needed, for example, like the one shown in FIG. 4 for human viewing. For machine sensing and autonomous driving purpose, reconstructing into a Panorama might not be necessary, as driving decisions may be as conveniently made based on sensed information as "flattened" on a ring shaped plate. The drawing of FIG. 3 is for purpose of showing concepts, and is not drawn to scale. The center part and corners of the silicon not used for building pixels may be used to build supplementary circuits for the chip, e.g., the interface, LO buffering and distribution, power regulation and distribution, which will not be elaborated herein.

For pixel array of rectangular shape on the sensor chip, individual pixels may be evenly placed according to grids of Cartesian coordinates, parallel to the edges, and address of the pixels are numbered accordingly, to represent direction of sensed objects. For pixel arrays of circular shape or ring shape, the individual pixels may be places along polar coordinates, e.g., spaced by equal polar angle and radial length to reflect equal angular step size of incoming lights from objects that form images at positions of pixels. Since in some applications, not all directions are of equal importance, multiple zones on the pixel array may be implemented with different pixel densities. Unevenly spaced pixels may be implemented to correct optical deformity as well.

Figure 5:
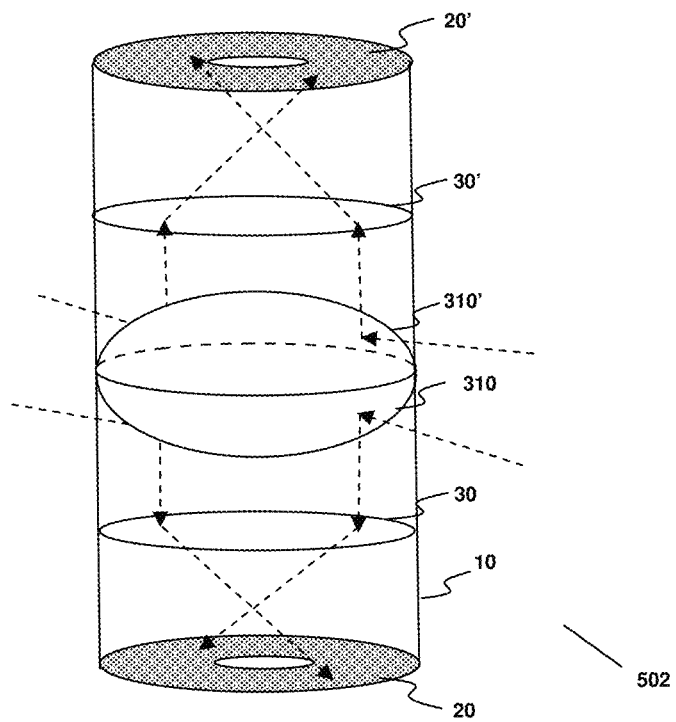
FIG. 5 illustrates another exemplary embodiment of an omnidirectional Doppler LIDAR for detecting objects in both upper and lower hemispheres.

FIG. 5 illustrates another exemplary embodiment of an omnidirectional Doppler sensing unit 502, to be able to sense objects in both lower and upper hemispheres, which is essentially a duplicated sensing unit structure as in FIG. 3 and is not elaborated again herein. Again the drawing of FIG. 5 is for purpose of showing concepts, and is not drawn to scale.

Figure 6:
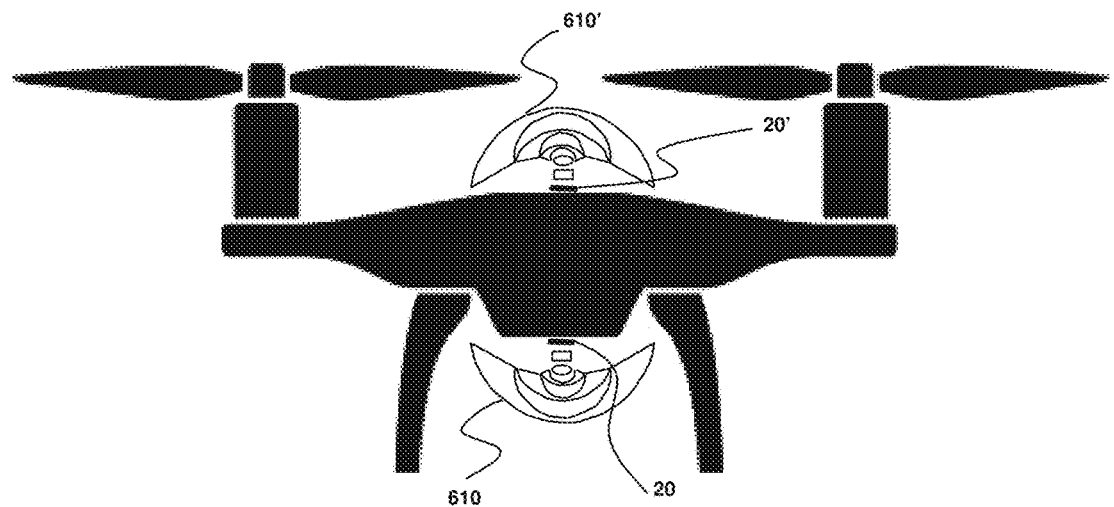
FIG. 6 illustrates yet another exemplary embodiment of an omnidirectional Doppler LIDAR for detecting objects in both upper and lower hemispheres.

In an alternative embodiment, the convex mirror(s) and the scope(s) in embodiments of FIGS. 3 and 5 may be replaced by a fish-eye optical scope and achieve nearly 180 degree view of a hemisphere, and two of such structure together will be able to perform Doppler sensing substantially in both upper and lower hemispheres. FIG. 6 shows an example of such omnidirectional Doppler sensing unit, in which the two Doppler sensors 20 and 20' are placed on upper and lower side of a drone, and fish-eye scopes 610 and 610' are installed in front of the sensor chips to project omnidirectional image onto the Doppler sensors 20 and 20', one to sense the lower hemisphere and the other to sense the upper hemisphere (The drawing is not drawn to scale).

Figure 7:
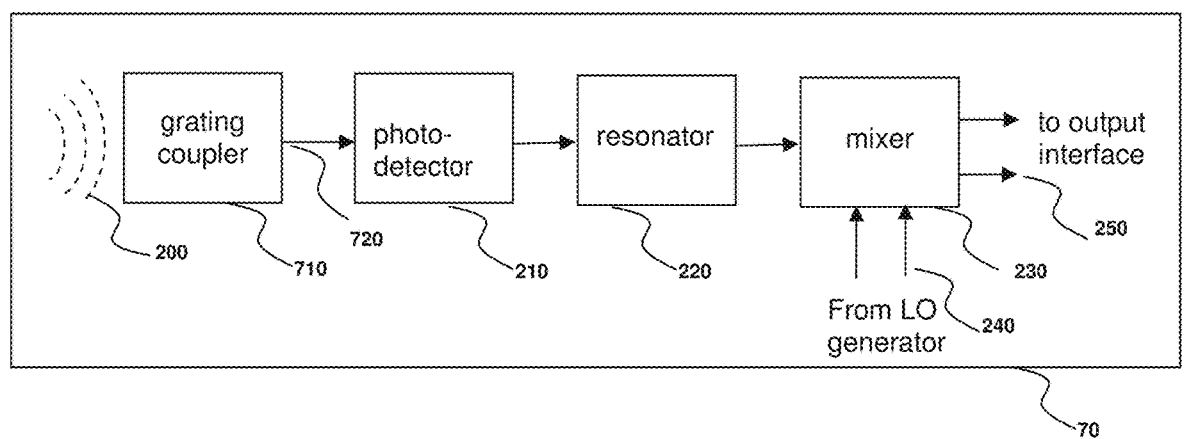
FIG. 7 shows a block diagram of another preferred embodiment built into each of the Doppler sensing pixels on the sensor chip as shown in FIG. 1.

FIG. 7 is another preferred embodiment built into each of the Doppler sensing pixels 70 on the sensor chip 20 as shown in FIG. 1. The modulated light signal 200 from one of the objects 101 (of FIG. 1) may be exposed to a pixel 70 in question through the optical scope 30 (of FIG. 1). The light signal 200 is coupled into the chip by a grating coupler 710, and then further coupled optically to a photo-detector 210 via on-chip optical path 720 such as an optical waveguide. Preferably the grating coupler 710 is tuned to the wavelength (frequency) of the modulated light source that illuminates the objects 101 (of FIG. 1) or to the wavelength (frequency) of beacons that are attached to objects being sensed (as disclosed in patent application U.S. Ser. No. 16/917,805). This way, lights in wavelengths away from the wavelength of the intended light sources are attenuated. The rest components 220, 230, function in the same way as described in FIG. 2 and is not described again.

Figure 8:
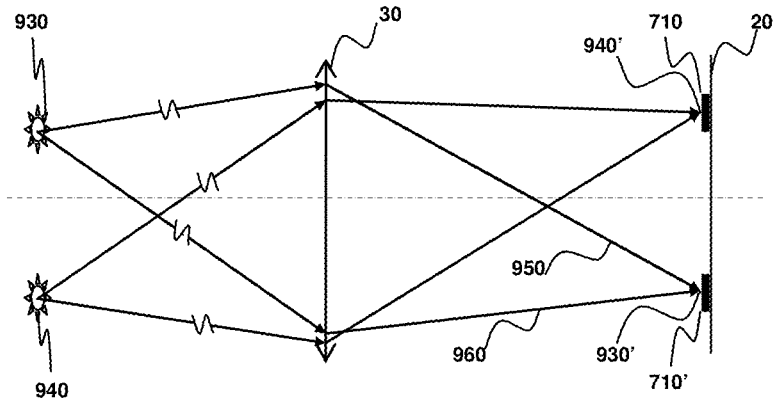
FIG. 8 shows an example of light path diagram that images project onto grating couplers on a sensor chip.
Figure 9:
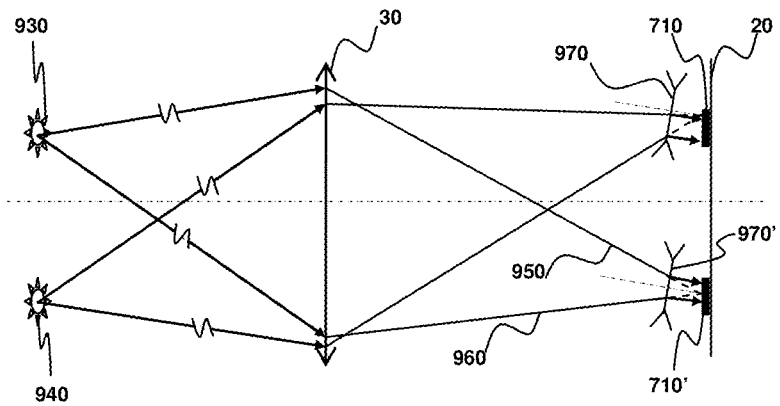
FIG. 9 shows an exemplary light path diagram in a preferred embodiment that improves efficiency of grating coupling using concave micro lens.
Figure 10:
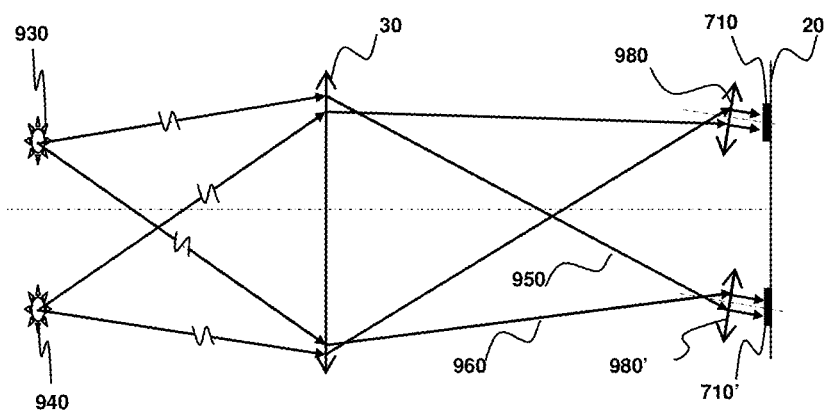
FIG. 10 shows an exemplary light path diagram in another preferred embodiment that improves efficiency of grating coupling using convex micro lens.

FIG. 8 shows an example of light path diagram that images project onto grating couplers on a sensor chip. In the figure, a portion of the sensor chip 20 is shown, as has been also described with FIG. 1. On the sensor chip 20, two grating couplers 710 and 710' are drawn. In front of the sensor chip, an optical scope 30 is placed, like the arrangement shown in FIG. 1 described hereinabove. As examples, two object points 930 and 940, each reflects light from a LIDAR modulated light source (not shown in drawing), and the reflected light may expose onto the entire lens of the scope 30, and refracted to make images 930' and 940' on the chip 20, preferably the scope 30 focused right on the light sensing plane of the sensor chip 20. In the example, the images 940' and 930' are exposed onto the grating areas of the grating couplers 710 and 710', respectively. As discussed with the embodiment of FIG. 7, the grating areas 710 and 710' are a part of the surface areas of pixels (like the pixel 70 of FIG. 1) and the grating couplers 710 and 710' are able to couple the lights from objects 940 and 930 inside the corresponding pixels for further processing. It also can be observed, however, that light signals from an object are exposed onto the grating with different incident angles, for example, lights from object 930 are exposed onto grating 710' with many incident angles including, as shown in drawing, the exemplary rays 950 and 960. The light rays come from every part of the optical aperture of scope 30, there are many incident rays like 950 and 960. As known to the skilled in the art, the coupling efficiency of a grating coupler depends on the incident angle. For a light signal of given frequency, there exist an optimal incident angle. In order to improve the coupling efficiency, as shown in FIG. 9, in a preferred embodiment, a micro concave lens (e.g., 970, 970' in the drawing) may be placed in front of each of the grating coupler areas of pixels to make the rays substantially parallel and at the optimal incident angle towards the grating surface. In this embodiment, the micro concave lens are preferably placed in a tilted angle so that the optical axes thereof are at the optimal incident angle towards the grating; the micro concave lenses are preferably placed at positions so that the focal points thereof are right at the surface of the gratings. Alternatively, by way of example as shown in FIG. 10, in another preferred embodiment, a micro convex lens (e.g., 980, 980' in the drawing) may be placed in front of each of the grating coupler areas of pixels to make the rays substantially parallel and at the optimal incident angle towards the grating surface. In this embodiment, the micro convex lens are preferably placed in a tilted angle so that the optical axes thereof are at the optimal incident angle towards the grating; the micro convex lenses are preferably placed at positions so that the focal points thereof are on the focal image plane of the scope 30. The micro lens may also be formed by a plurality of lens pieces. The FIGS. 8, 9 and 10 are not drawn to scale.

The amount of Doppler sensing data to be transferred out of the sensor chip 20 depends on 1) total number of pixels; 2) maximum bandwidth in the mixing product signals, which is proportional to the maximum Doppler shift of concern in the application, and in embodiments using FMCW modulating signal, it also depends on FM sweeping rate and maximum range in design. If the data interface is able to convey all digitized data from all pixels, then the chip may simply passing the mixing product signals through an anti-aliasing filter (not shown in drawings of FIGS. 1 and 2) and then use analog to digital converter (not shown in drawings too) to digitize the filtered analog signal, time multiplexing the data by the interface circuits on chip (not shown in drawings), and send them out. If the amount of data is too large to be all passed, it is preferable to locally pre-process the result and select to pass only the output signals from "important" pixels, or provide variable amount of data dependent of determined priority of pixels.

What pixels are "important"? How does the sensor chip 20 determine it? The answer is application dependent. Take the example of autonomous vehicle application in a "controlled" traffic region, in which all vehicles are equipped with beacon transmitters (e.g., the ones described in patent application U.S. Ser. No. 16/917,805), and all land structure in the region are also marked by such beacons, then the important pixels may be those with beacon signals exposed onto them that are much stronger than reflected background signals. The ones with closer distances and positive Doppler shifts (i.e., approaching objects) are most important ones since they are the objects may have higher potential risk of collisions with the vehicle in question. In application scenarios to detect reflected signals, the signal strength may not be a reliable measure as the signal strength depends not only on distance and size of objects, but also depends on surface properties of objects. In this case, a high positive Doppler as well as close distance may be good criteria for selecting important pixels to output data.

On-chip hot spot detection is a pre-selection of pixels and their neighboring ones that need to watch with higher attention, so as to output these data to off-chip DSP for further processing. For signal strength based selection, may use sum-and-dump (integrate and discharge) of absolute values/magnitude of mixing product signals at a given time interval, and pass the results to a threshold; for Doppler shift based selection, estimators of frequency or angular speed (of phase) may be used, e.g., an estimator based on frequency counter may use threshold comparator (preferably with appropriate amount of hysteresis) to detect and count number of "sign" changes in the mixing product signals from mixers that mix with CW local replicas during a given time interval to determine, or alternatively based on time needed for a given number of "sign" changes thereof to determine, and in either case, may choose to only count the "sign" changes in the direction of phase rotations for positive Doppler shifts (approaching objects). As known in the art, distance may also be determined based on frequency information using FMCW technique. In the selection of important pixels, quick and potentially less accurate processing may be used, and relying on more accurate further processing on DSP 60 for final processing.

Alternatively, in another preferred embodiment, since both distance and radial velocity of an object can be derived from frequency information of the mixing product signals of the pixels, instead of output the raw mixing product signals, the pixels may only output the detected frequency values or a quantity associated with the frequency, such as a phase angular rate. Frequency estimators (or equivalent) may be implemented in the pixels to obtain the detected values of frequency or quantities associated with the frequency. Frequency estimators are well known to the skilled in the art, including the examples in the previous paragraph. In further alternative embodiment, pixels may output estimated frequency values as baseline output, and based on feedback from external DSP 60, some subset of pixels are selected to provide raw digitized mixing product signals.

Priority based data interface protocol is an important feature for massive sensing data device in time critical, mission critical and/or consequence critical applications, such as the example discussed herein—the massive parallel sensing pixels of a LIDAR in autonomous vehicle control. In the following paragraphs, we describe some preferred embodiments of data interface protocol suitable for the LIDAR architecture disclosed in this patent application as well as in the priority application (application Ser. No. 16/926,400).

In one preferred embodiment, a set of initial sensing data may be conveyed with equal priority, and may simply convey sensing data of all pixels with a low initial update rate (on a simple "frame by frame" basis); alternatively, to quickly get an overall picture, may reduce initial resolution among pixels, for example only convey one pixel data every L pixels in column numbers and one every P in row numbers. The output of each of the pixels may be transferred out by a truncated limited length block, and pixels are served one by one in a sequential order according to the pixel location addresses, such as by incremental column numbers of each row and then by incrementing the row numbers. After receiving and processing the initial data, the DSP processor 60, will provider a feedback table to the sensor chip 20 that each of the pixels is assigned to a priority level i, where i=1, 2, . . . , N. According to the priority level assigned in the table, the sensor chip 20 will adjust the data conveying settings onwards and continue to receive new feedback tables from the DSP processor 60, and readjust data conveying settings accordingly. Alternatively, the feedback table provided by the DSP processor 60 may contain more parameters than just N priority levels, for example, may include sampling rate, block size, update rate, and order of pixels to send data, etc. When the DSP processor 60 is detecting the LIDAR orientation is in change, for example, when a vehicle is making a turn, the feedback table may provide aiming adjust parameters predicted. The table may also include additional moving prediction parameters. For example, when a set of pixels related to a brick on road in the lane driving along, the set of pixels may currently be assigned to a high priority for data transfer, and predict a new set of pixels after moving, and assigning them to high priority automatically in next period of time without further feedback.

Figure 11:
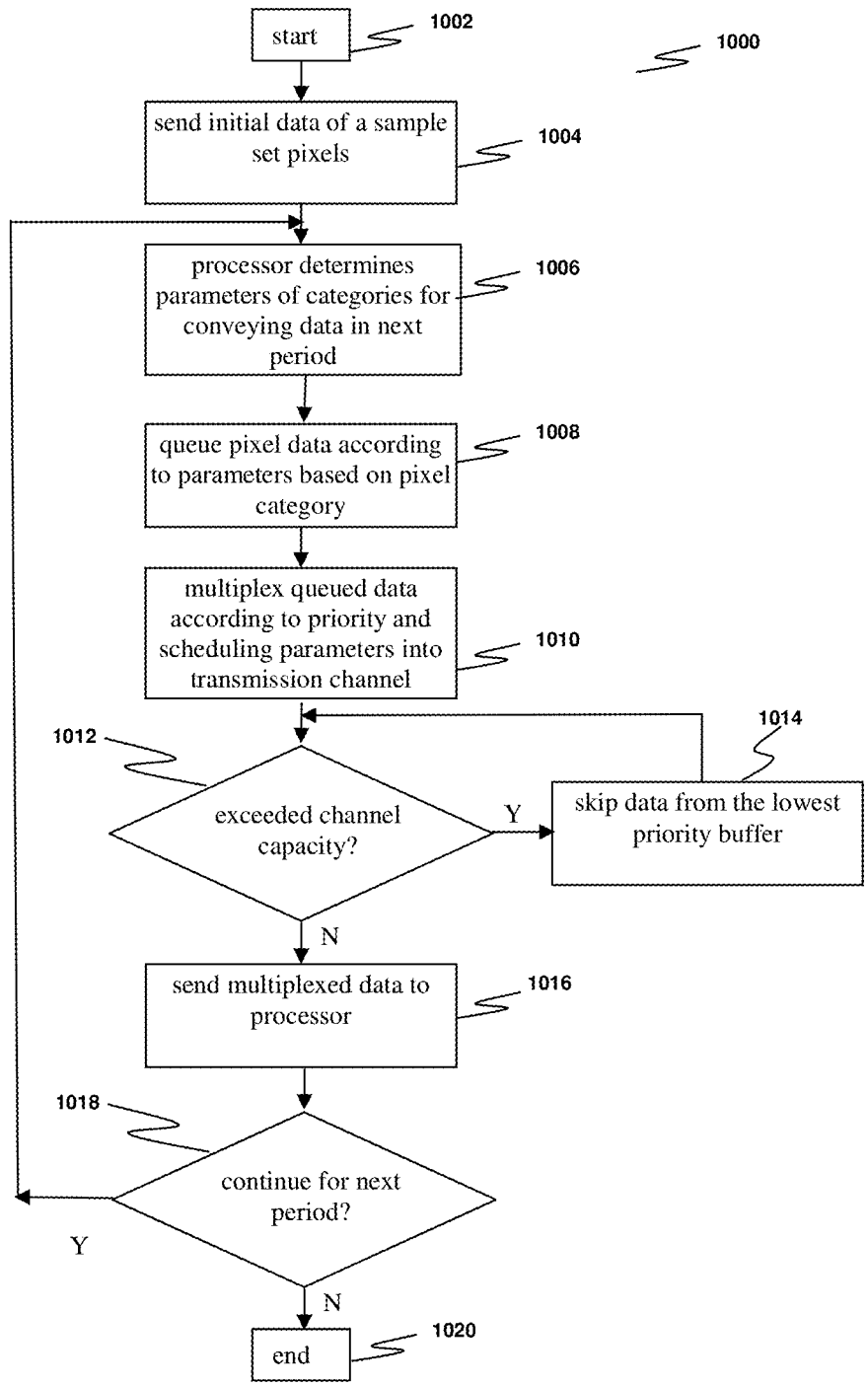
FIG. 11 shows a flowchart of steps for effectively conveying data from pixels of a sensor device to a processor based on feedbacks from the processor.

The process described in the above paragraph may be performed, in a preferred embodiment, as shown in the flowchart of FIG. 11. This flowchart 1000 shows steps for effectively conveying data from pixels of the sensor device to the processor based on feedbacks from the processor. The process start at step 1002, then send initial sensor data generated from a sample set of pixels to the processor. Receiving the initial data, in step 1006, the processor determines a table of parameters for each of a plurality categories associated with each of the sensor array pixels. Next in step 1008, data obtained by each of the pixels are queued into buffers for each of the categories according to the determined categories and the table of parameters determined. The queued data then at step 1010 are multiplexed into transmission channel for transmission to the processor, according to priority and scheduling parameters for each category. If at given time the scheduled data is detected to exceed the channel capacity for transferring 1012, the lowest priority data scheduled will be dropped 1014 until the channel capacity can afford sending the rest scheduled data and the data will be send to the processor at step 1016. If the sensor device will continue to work 1018, it proceeds to repeat the steps 1006, 1008, 1010, 1012, 1014 and 1016, otherwise, the process stops at step 1020.

In another preferred embodiment, in addition to determining data conveying parameters based on feedback from the DSP processor 60, the chip may also implement on-chip preprocessing to determine priority of pixels to convey data from. This will react more quickly to sudden changes. For example, in highway driving condition, the LIDAR may be installed on a car that follows another car driving in the same direction, feedback from the DSP processor 60 may be very good in determining pixel data priority corresponding to surrounding cars that already for a while exist in the field of view, and the pixels corresponding to the open sky, but may not react quickly enough if a brick on the highway previously blocked by the car in front suddenly appears after the front car no longer blocks its view. On-chip processing must quickly determine the sudden change after being able to see the brick approaching at a high speed, and quickly assign the pixels around the image of the brick to a priority possibly even higher than the highest in the feedback table may have assigned to. The on-chip processing may not be as accurate, and may erroneously assign a high priority when it is not necessary, but the nature of time, mission and consequence critical control cannot afford missing or delaying any data for a truly dangerous event.

Figure 12:
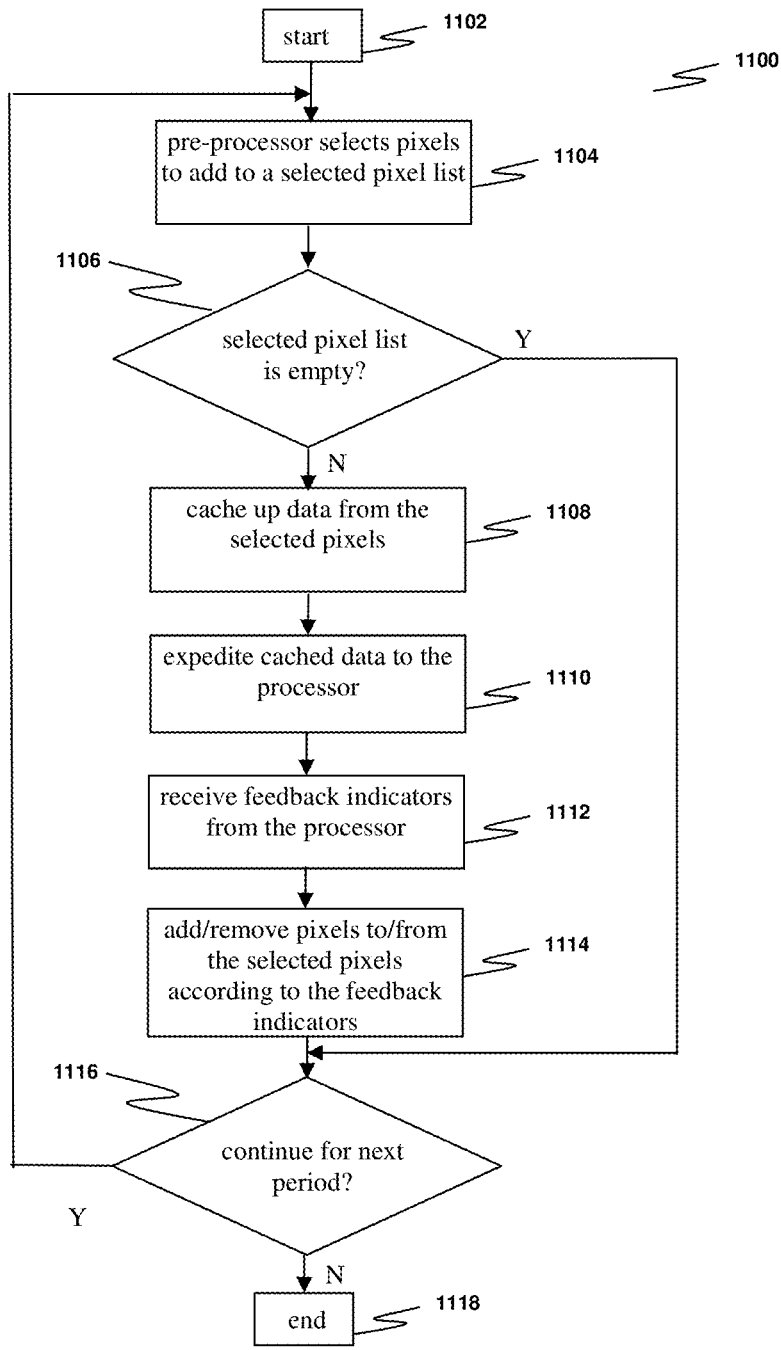
FIG. 12 shows a flowchart of additional steps for conveying even higher priority data from pixels of a sensor device to a processor, using on-chip pre-processor to select the higher priority pixel set, and using the processor feedbacks to further adjust the higher priority pixel set.

In one embodiment, the above described processing can be performed by flowchart 1100 shown in FIG. 12. The process starts at step 1102, the pre-processor selects pixels to be added to a selected pixel list for higher priority transmission at 1104, if the selected pixel list is empty it proceeds to step 1116, otherwise, if there exist pixels in the selected pixel list, the data from these pixels are cached up at step 1108, send cached data with the high priority to the processor at step 1110. Next in step 1112, feedback indicators are received from the processor, and according to the feedback indicators, add or remove pixels to/from the selected list at 1114. At step 1116, if the sensor device will continue to work, it proceeds to repeat the above steps 1104, 1106, 1108, 1110, 1112 and 1114, otherwise the process 1100 stops at step 1118.

In addition to the raw sensing data (e.g., the digitized mixing product signal) or estimated/pre-processed sensing data (e.g., the estimated frequency values of mixing product signals, or quantities associated with the frequency), the contents of data output from each pixel may further include pixel position index in the array, timestamp, estimated level of time criticalness, estimated level of consequence criticalness, parameters related to data quality (level of confidence, e.g., signal strength, signal to interference ratio, margin toward saturation, level of platform vibrations, weather visibility, etc.), and time to next scheduled data.

Figure 13:
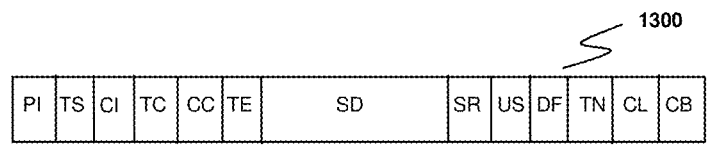
FIG. 13 shows a packet structure of data in an embodiment for the transmission from the pixels of sensor array to the processor non-sequentially.

By way of example, FIG. 13 shows a packet structure of data in an embodiment for transmission from the pixels of sensor array to the processor non-sequentially. The packet 1300 is formed by a plurality of fields, including position index (PI) of a pixel in the sensor array, timestamp (TS) at which the packet of data is collected, category indicator (CI) of priority, estimated level of time criticalness (TC), estimated level of consequence criticalness (CC), time to expire (TE) of the packet data, the sensor data (SD) from the pixel, sampling rate (SR), under sampling (US) range indicator, decimation factor (DF), time to next scheduled data (TN), confidence level indicator (CL) and error correction check bits (CB) for the packet.

According to level of time criticalness or level of priority, pixel data packets may be queued in a plurality of queuing data buffers, each queuing buffer is assigned to an update rate that needs to meet. A scheduler controls a multiplexer to select data among the queuing buffers to send through transmission channel. Among the plurality of queuing data buffers, data packet structure may be different, e.g., different block length, holding data of different sampling rate or decimating factor. For example, the pixels corresponding to the open sky may be queued in a buffer with low update rate, and high decimating factor in time and space (number of pixels to skip); pixels corresponding to or close to object boundaries (e.g., contours of vehicles, pedestrians, curbs, poles, lane line, and other objects) may be queued in a dedicated queue or queues. For certain purpose of processing, a set of adjacent pixels may be grouped to combine their mixing product signals into one single output, in a way forming a larger "super pixel". Such sensing data may be queued separately with special settings of parameters for transmission.

In an alternative embodiment, the DSP 60 may be implemented on the sensor chip 20 in entirety or partially, so that processing of signals created by all pixels are performed within the chip 20, or at least in part.

Figure 14:
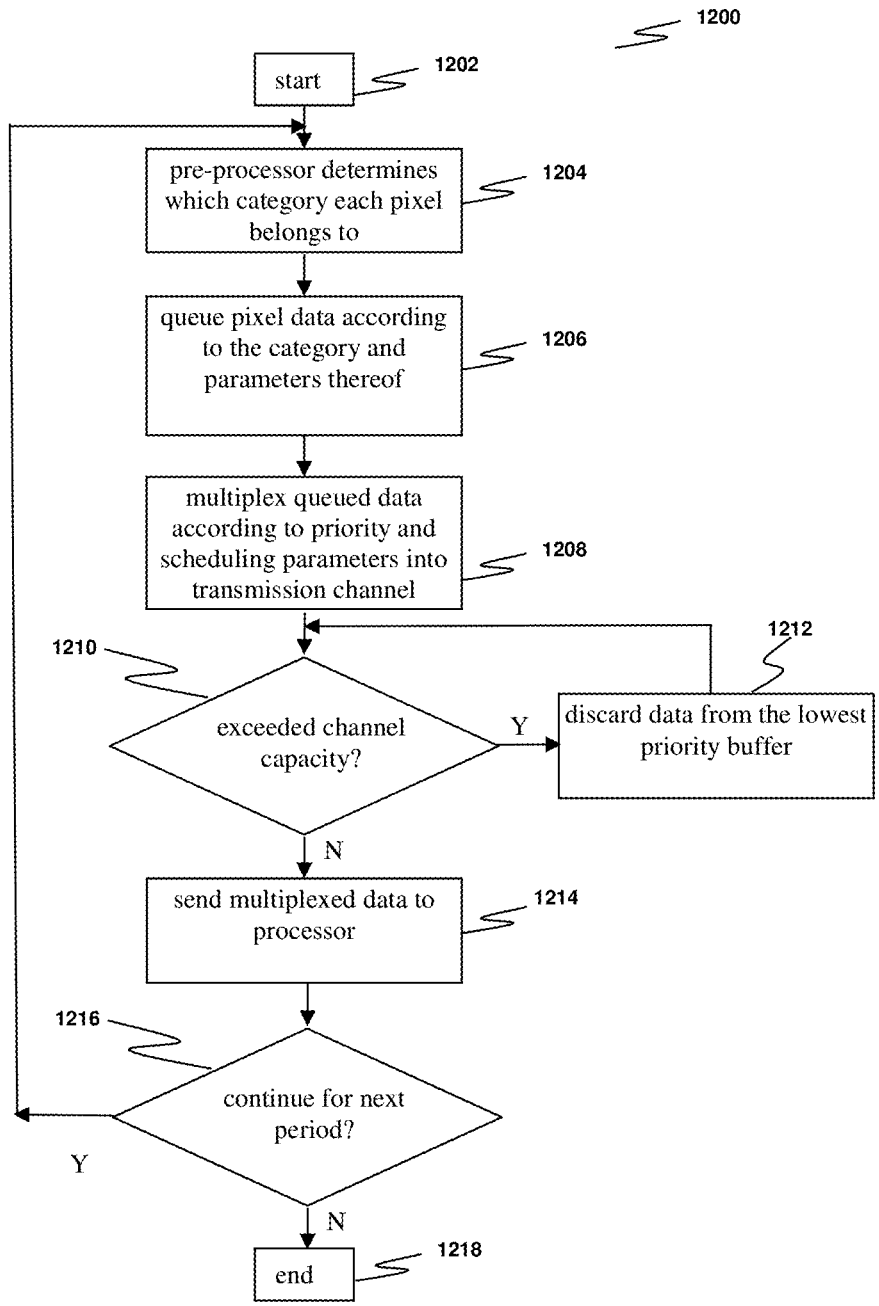
FIG. 14 illustrates a flowchart of steps for effectively conveying data from pixels of a sensor device to a processor using a pre-processor locally coupled with the pixels to determine priority categories.

FIG. 14 illustrates a flowchart of steps for effectively conveying data from pixels of a sensor device to a processor, using a pre-processor locally coupled with the pixels to determine priority categories. The process 1200 starts at step 1202. Then at step 1204 a pre-processor locally coupled with the pixels determines which priority category each pixel in the sensor array belongs to. Next at step 1206 the data of pixels are queued to the buffers according to the determined category and the parameters associated with the category. At step 1208, multiplex the queue data according to priority and scheduling parameters into transmission channel, if the data to be multiplexed exceeds the channel capacity for transmission 1210, then at step 1212 discard the data being multiplexed from the buffer of lowest priority category till the channel capacity is able to send the multiplexed data, and send them at 1214. If the sensor device will continue to work 1216, repeat the steps 1204, 1206, 1208, 1210, 1212 and 1214, otherwise, stop the process at 1218.

In some application scenarios, it is desirable to illuminate surroundings simultaneously using said modulated light source, so that all directions of sensing interest will be illuminated. One embodiment to achieve this is to use the apparatus shown in FIG. 3 in a reversed light propagation direction, i.e., the modulated light source is placed at position of 20, emits the modulated light, and the light comes out through the optics 30 and is reflected by convex mirror 310 towards surrounding objects. Light energy may also be more densely focused towards directions that need longer illumination range, e.g., more concentrated towards front than back and sides in vehicular applications.

Certain terms are used to refer to particular components. As one skilled in the art will appreciate, people may refer to a component by different names. It is not intended to distinguish between components that differ in name but not in function.

The terms "including" and "comprising" are used in an open-ended fashion, and thus should be interpreted to mean "including, but not limited to". The terms "example" and "exemplary" are used simply to identify instances for illustrative purposes and should not be interpreted as limiting the scope of the invention to the stated instances.

Also, the term "couple" in any form is intended to mean either a direct or indirect connection through other devices and connections.

It should be understood that various modifications can be made to the embodiments described and illustrated herein, without departing from the invention, the scope of which is defined in the appended claims.

We claim:

1. A method for effectively conveying data from pixels of a sensor device to a processor, comprising steps of:
   sending initial data produced by a sample set of pixels to a processor;
   determining, by the processor, a table of parameters specifying a number of categories for conveying data in a next period from each of the pixels;
   queuing, for each of the categories, the data produced by pixels into queuing buffers according to the parameters for the corresponding category that a pixel is assigned to;
   multiplexing, according to priority and scheduling parameters in the table, the queued data from the buffers into a transmission channel;
   if the transmission channel cannot convey all queued data in the buffers according to the scheduling parameters specified in the table, discarding some most stale data from the lowest priority buffers; and
   repeating the determining, queuing, multiplexing and discarding steps above in another next period.

2. The method of claim 1, further comprises steps of:
   selecting, by a pre-processor locally coupled with the pixels, a subset of pixels;
   caching up data from the selected pixels;
   expediting the cached data to the processor over the transmission channel;
   receiving, from the processor, feedback indicators;
   adding/removing pixels for caching according to the feedback indicators over a period; and
   repeating the selecting, caching, expediting, receiving, and adding/removing steps.

3. The method of claim 2, wherein the period is specified by the feedback indicators.

4. The method of claim 1, wherein the data is grouped in packets, and said packets include
   a sensor data, and at least one of:
   a position index of the pixel from which said sensor data in said packet is produced;
   a timestamp of the data packet at which said sensor data is produced;
   a sampling rate of the said sensor data;
   an under sampling range indicator;
   a decimation factor of the said sensor data;
   an estimated level of time criticalness;
   an estimated level of consequence criticalness;
   a data queuing category indicator;
   time to expire for said sensor data;
   a confidence level indicator;
   time to next scheduled data of this kind; and
   error correction check bits.

5. The method of claim 1, wherein the table of parameters includes at least one of:
   position index or range of position index of pixels;
   prediction of position index or range of position index of pixels in a future interval based on moving and aiming change;
   category index for data queuing and transmission;
   level of time criticalness;
   level of consequence criticalness;
   sensor signal type;
   sensor signal sampling rate;
   sensor signal decimation factor;
   sensor data block length in a packet;
   packet update rate;
   desired packet update rate;
   guaranteed minimum packet update rate; and
   conditions for discarding data.

6. A method for effectively conveying data from pixels of a sensor device to a processor, comprising steps of:
   determining, by a pre-processor locally coupled with the pixels, which of a plurality of categories each of the pixels is assigned to;
   queuing data produced by the pixels into queuing buffers, according to the category being assigned to, and according to a set of parameters associated with the category;
   multiplexing, according to priority and scheduling parameters specified for the categories, the queued data from the buffers into a transmission channel;
   discarding, if the transmission channel cannot convey all queued data in the buffers according to the scheduling parameters specified for the categories, some most stale data from the lowest priority buffers; and
   repeating the determining, queuing, multiplexing and discarding steps above in next period.

7. The method of claim 6, wherein the data is grouped in packets, and said packets include a sensor data, and at least one of:
- a position index of the pixel from which said sensor data in said packet is produced;
- a timestamp of the data packet at which said sensor data is produced;
- a sampling rate of the said sensor data;
- an under sampling range indicator;
- a decimation factor of the said sensor data;
- an estimated level of time criticalness;
- an estimated level of consequence criticalness;
- an data queuing category indicator;
- time to expire for said sensor data;
- a confidence level indicator;
- time to next scheduled data of this kind; and
- error correction check bits.

8. The method of claim 6, wherein the set of parameters associated with each of the categories include at least one of:
- level of time criticalness;
- level of consequence criticalness;
- sensor signal type;
- sensor signal sampling rate;
- sensor signal decimation factor;
- sensor data block length in a packet;
- packet update rate;
- desired packet update rate;
- guaranteed minimum packet update rate;
- maximum allowed queuing delay; and
- conditions for discarding data.

* * * * *